US011243875B1

United States Patent
Cieslak et al.

(10) Patent No.: US 11,243,875 B1
(45) Date of Patent: Feb. 8, 2022

(54) FEATURE ROLLBACK FOR INCAPABLE MOBILE DEVICES

(71) Applicants: Michael Cieslak, Los Angeles, CA (US); Jiayao Yu, Venice, CA (US); Kai Chen, Manhattan Beach, CA (US); Farnaz Azmoodeh, Venice, CA (US); Michael David Marr, Monroe, WA (US); Jun Huang, Beverly Hills, CA (US); Zahra Ferdowsi, Marina del Rey, CA (US)

(72) Inventors: Michael Cieslak, Los Angeles, CA (US); Jiayao Yu, Venice, CA (US); Kai Chen, Manhattan Beach, CA (US); Farnaz Azmoodeh, Venice, CA (US); Michael David Marr, Monroe, WA (US); Jun Huang, Beverly Hills, CA (US); Zahra Ferdowsi, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 88 days.

(21) Appl. No.: 16/390,167

(22) Filed: Apr. 22, 2019

(51) Int. Cl.
*G06F 11/36* (2006.01)

(52) U.S. Cl.
CPC ...... *G06F 11/3696* (2013.01); *G06F 11/3688* (2013.01); *G06F 11/3692* (2013.01)

(58) Field of Classification Search
CPC ....... G06F 11/36–3696; G06F 8/00–78; G06F 11/3696; G06F 11/3688; G06F 11/3692
See application file for complete search history.

(56) References Cited

U.S. PATENT DOCUMENTS

| | | | | |
|---|---|---|---|---|
| 2009/0320002 | A1* | 12/2009 | Peri-Glass | G06F 8/38 717/131 |
| 2016/0124839 | A1* | 5/2016 | Mordo | G06F 11/3692 717/124 |
| 2018/0275986 | A1* | 9/2018 | Ghosh | G06F 8/71 |
| 2019/0042399 | A1* | 2/2019 | Nemoto | G06F 11/3688 |

OTHER PUBLICATIONS

Zhang, Tao, et al. "Compatibility testing service for mobile applications." 2015 IEEE Symposium on Service-Oriented System Engineering. IEEE, 2015. (Year: 2015).*

(Continued)

*Primary Examiner* — Doon Y Chow
*Assistant Examiner* — Joanne G Macasiano
(74) *Attorney, Agent, or Firm* — Culhane Meadows PLLC; Stephen J. Weed

(57) ABSTRACT

Systems, devices, media, and methods are presented for testing the capability of a mobile device to run a particular feature of an application. Each feature may include a package of code, a call, a state, and a condition; each condition correlated with a specific state. The call is a query that includes instructions to evaluate whether the application will run successfully if a particular feature is running. If the call fails, the feature condition remains Off, resulting in a rollback of the feature. If the call succeeds, the feature condition is changed to On. The system may include an experimentation framework on each mobile device for registering features, executing calls, logging results, and maintaining states and conditions.

14 Claims, 5 Drawing Sheets

(56) References Cited

OTHER PUBLICATIONS

Ali, Shaukat, et al. "A state-based approach to integration testing based on UML models." Information and Software Technology 49.11-12 (2007): 1087-1106. (Year: 2007).*

Rahman, Md Tajmilur, et al. "Feature toggles: practitioner practices and a case study." Proceedings of the 13th international conference on mining software repositories. 2016. (Year: 2016).*

* cited by examiner

FEATURE ROLLBACK FOR INCAPABLE MOBILE DEVICES

TECHNICAL FIELD

Examples set forth in the present disclosure relate generally to mobile device management. More particularly, but not by way of limitation, the present disclosure addresses an experimentation framework for testing the capability of a mobile device to run a particular feature of an application.

BACKGROUND

Tens of thousands of different types of mobile computing devices are currently in use worldwide, each having different capabilities. Most mobile devices operating in a network will transmit a user-agent string containing valid information such as the device type, its operating system, software version, applications, and configuration attributes. Configuration attributes typically includes information about the functional and physical attributes of a particular software application, on a particular device, at a particular time.

Software applications that are installed on thousands of devices are typically maintained using a mobile device management (MDM) system, which allows administrators to control, secure, and enforce policies on a variety of different types of mobile devices. MDM tools may be used to control the release and distribution of applications, configuration attributes, updates, and new features. Many mobile applications are configured to allow independent software developers to create new or improved features that are specifically designed to work with or otherwise enhance the mobile application.

An application programming interface (API) in some instances is a software-based intermediary that allows two devices or two applications to communicate. Different APIs can be designed and built for specific purposes. An API Call is a query or request for information. For example, a mobile device may execute and send an API Call to a particular application on the mobile device, which processes the query and returns a result. In another example, a server may send an API Call requesting the configuration attributes associated with a particular application to a remote mobile device, which processes the query and returns a result including the attributes to the server. The term API is also used sometimes to describe discrete functions or features associated with an application.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1:
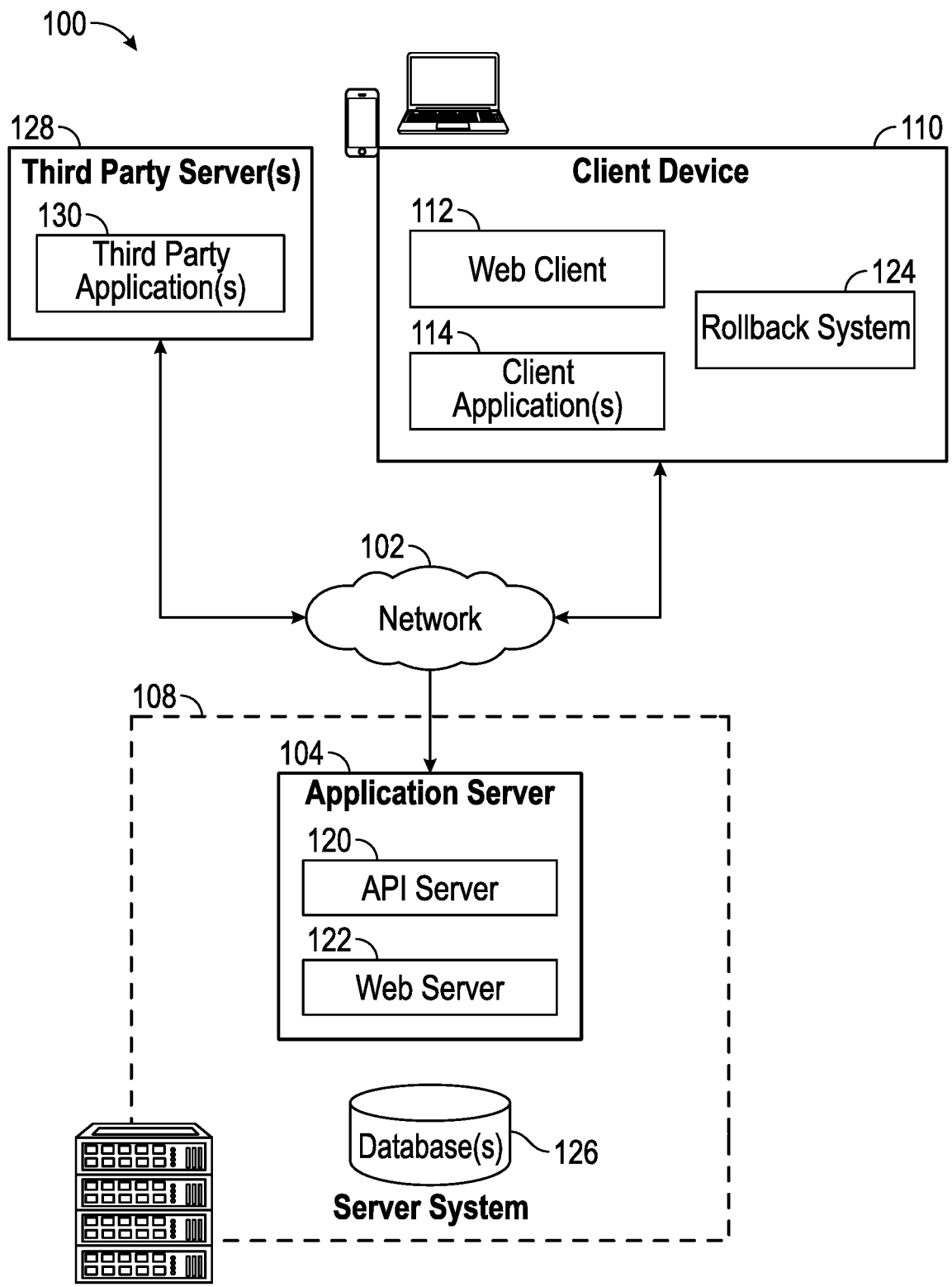
FIG. 1 is a block diagram showing an example rollback system on a client device in a system operated over a network.

Various implementations and details are described with reference to an example: an experimentation framework installed on a client device for testing the capability of that device to run a particular feature. The experimentation framework maintains data for a plurality of features. Each feature stored in the experimentation framework is assigned one of four states (Registered, Pending, Failed, Succeeded) and one of three conditions (Experimental, Off, On). After a new feature is registered on the experimentation framework, the method executes a test of the new feature on the client device. The condition of the new feature is changed to On if and only if the test is successful. If the test fails, the condition changes to Off, resulting in a rollback of that new feature by the mobile device; thereafter preventing the device from attempting to run that feature. In addition to the example rollback system, the systems and methods described herein may be applied to and used with any of a variety of systems, especially those for which high availability and precise control of features and devices is desired.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

Software applications may include a number of well-defined functions or features, referred to sometimes as APIs (application program interfaces). The owner or administrator of an application may decide to try a new API that is experimental and/or the way it might function on particular devices is unknown. Releasing the new API without controls may create substantial problems for users. Testing the new API on every device before release is impractical. Moreover, building a list of allowed and disallowed devices by type will not work because some devices have a fake identity.

Although most mobile devices transmit a user-agent string that contains valid information, some strings contain false information. For example, a fake or counterfeit device may include a user agent that generates information about the capabilities of an authentic device, when in fact the counterfeit device does not have those capabilities. For a variety of reasons, some user agents are intentionally manipulated to send false information; for example, a string from an Android-based phone may identify itself as an iOS-based tablet in order to access iOS-only content. When a new API or feature is experimental and the mobile device identities are unreliable, the owner or administrator faces the difficult challenge of determining which mobile devices are actually capable of running the new API or feature.

FIG. 1 is a block diagram illustrating a system 100, according to some examples, configured to automatically control the release of a new or improved feature. The system 100 includes one or more client devices such as client device 110. The client device 110 may include, but is not limited to, a mobile phone, desktop computer, laptop, portable digital assistant (PDA), smart phone, tablet, Ultrabook, netbook, laptop, multi-processor system, microprocessor-based or programmable consumer electronic device, game console, set-top box (STB), computer in a vehicle, or any other communication device that a user may utilize to access the system 100. In some examples, the client device 110 includes a display module (not shown) to display information (e.g., in the form of user interfaces). In further examples, the client device 110 includes one or more of touch screens, accelerometers, gyroscopes, cameras, microphones, global positioning system (GPS) devices, and so forth. The client device 110 may be a device of a user that is used to access and utilize an online social platform. For example, the client device 110 may be used to open an application, to input information and create an account, and to execute any of a variety of application-driven tasks such as capturing images, creating and sending content, receiving and viewing content from others, and so forth.

For example, client device 110 is a device of a given user who would like to create an account on an online social platform. Client device 110 accesses a website of an online social platform (e.g., hosted by server system 108). The user inputs login credentials associated with the user. Server system 108 receives the request and provides access to the online social platform.

As another example, client device 110 is a device that downloads an update from an application distribution platform for an application, such as an online social platform hosted by server system 108. The update includes a feature having an action setting that has been changed from Disable to Enable by the server system 108, which also monitors the performance and other metrics associated with the application. In use, the feature has a defect that causes the application to crash or exhibit some other anomaly. In response, the server system 108 changes the action setting from Enable to Pause (or to Disable) for the client device 110 as well as other devices 110 using the application, until the feature defect can be repaired or otherwise corrected.

One or more users may be a person, a machine, or other means of interacting with the client device 110. In examples, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via the network 102. In this instance, the other entities in the system 100, in response to receiving the input from the user, may communicate information to the client device 110 via the network 102 to be presented to the user. In this way, the user interacts with the various entities in the system 100 using the client device 110.

The system 100 further includes a network 102. One or more portions of network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMAX network, a broadband cellular network (e.g., 3G, 4G, 5G, and the like) operated according to the LTE standard or otherwise, another type of network, or a combination of two or more such networks.

The client device 110 may access the various data and applications provided by other entities in the system 100 via web client 112 (e.g., a browser) or one or more client applications 114. The client device 110 may include one or more client application(s) 114 (sometimes referred to as apps) such as, but not limited to, a web browser, messaging application, electronic mail (e-mail) application, an e-commerce site application, a mapping or location application, an online home buying and selling application, a real estate application, and the like. The client device 110 in some implementations includes a rollback system 124 as described herein.

In some examples, one or more client application(s) 114 are included in a given one of the client device 110, and configured to locally provide the user interface and at least some of the functionalities, with the client application(s) 114 configured to communicate with other entities in the system 100 (e.g., third-party server(s) 128, server system 108, etc.), on an as-needed basis, for data processing capabilities not locally available (e.g., to access location information, to authenticate a user, etc.). Conversely, one or more client application(s) 114 may not be included in the client device 110, and then the client device 110 may use its web browser to access the one or more applications hosted on other entities in the system 100 (e.g., third-party server(s) 128, server system 108, etc.).

A server system 108 provides server-side functionality via the network 102 (e.g., the Internet or wide area network (WAN)) to: one or more third party server(s) 128, and one or more client devices 110). The server system 108 includes an application server 104 including an application program interface (API) server 120, and a web server 122, each of which may be communicatively coupled with one or more database(s) 126. The one or more database(s) 126 may be storage devices that store data related to (a) users of the server system 108, (b) applications associated with the server system 108, (c) cloud services, (d) data, identifiers, settings, and other characteristics associated with updates and features, and (e) any of a variety of other types of data. The one or more database(s) 126 may further store information related to third party server(s) 128, third-party application(s) 130, client device 110, client application(s) 114, users, and so forth. In one example, the one or more database(s) 126 may be cloud-based storage.

The server system 108 may be a cloud computing environment, according to some examples. The server system 108, and any servers associated with the server system 108, may be associated with a cloud-based application, in one example.

The client device 110 in some implementations includes a rollback system 124 that may be associated with a cloud-based application and may obtain user data, event logs, system metrics, data about updates and features, and the like, which are associated with a particular application, such as an online social platform, from the one or more databases 126 or other records on the server system 108.

The system 100 further includes one or more third party server(s) 128. The one or more third-party server(s) 128 may include one or more third party application(s) 130. The one or more third party application(s) 130, executing on third party server(s) 128 may interact with the server system 108 via API server 120 via a programmatic interface provided by the API server 120. For example, one or more the third-party applications 132 may request and utilize information from the server system 108 via the API server 120 to support one or more features or functions on a website hosted by the third party or an application hosted by the third party. The third-party application(s) 130, for example, may provide software version analysis functionality that is supported by relevant functionality and data in the server system 108.

Figure 2:
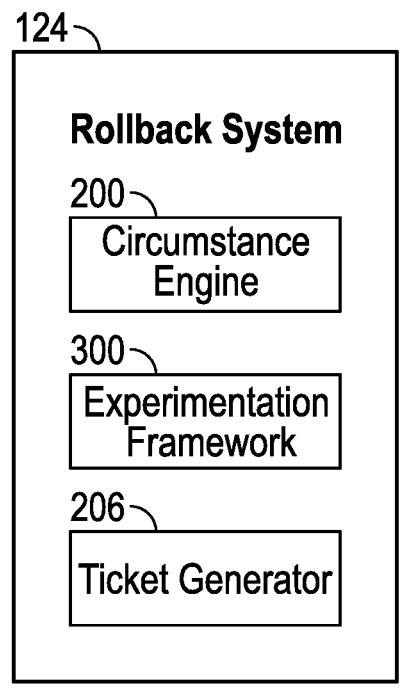
FIG. 2 is a block diagram of the rollback system of FIG. 1, in accordance with some example implementations.

FIG. 2 is a block diagram of an example rollback system 124. The rollback system 124 includes a circumstance engine 200, an experimentation framework 300, and a ticket generator 206.

The experimentation framework 300 is implemented in the client device 110 and is configured to register features, test the ability of an application to run features, and rollback a feature if the mobile device is not capable of running the feature. Each feature may include a package of code, a state, and a condition. The feature may also include a call, as described herein. The term feature includes entirely new features and improvements to existing features. The feature may be one developed by the owner of the application or by a third-party feature developer with access to a toolkit, instructions, guidelines, a portal, or other resource for use when developing compatible features.

The experimentation framework 300 in some embodiments includes, for each feature, one of four (4) states, each of which is associated consistently with one of three (3) conditions. For example:

| State | Condition |
|---|---|
| Registered | Experimental |
| Pending | Off |
| Failed | Off |
| Succeeded | On |

The associations between states and conditions is described as correlated or consistent because the state of Registered is always associated with the condition of Experimental; the Pending state (and the Failed state) is always associated with the Off condition; the Succeeded state is always associated with the On condition.

The status of each condition is also described as persistent; that is, the condition will not change unless the state changes. The condition remains Experimental as long as the state is Registered. The condition is Off as long as the state is Pending or Failed. The condition is On as long as the state is Succeeded.

In use, when a new feature is added or registered, the experimentation framework 300 on the client device 110 sets the state to Registered for the new feature and, accordingly, the condition changes to Experimental. Registered indicates the new feature has not been tried or tested yet; only registered. In some embodiments, the feature developer 100 completes the task of adding a new feature to the experimentation framework 300. Any later queries about the new feature will return the state (Registered) and/or the condition (Experimental).

A feature may also include a call, such as an API Call, that includes one or more instructions intended to evaluate the capability of a particular mobile device to run an application while running the feature. The call may originate from the mobile device 110 itself or from another source in the system 100. The call may be configured to obtain a message, either positive or negative. If the feature, if installed, would cause the application to fail or otherwise malfunction, then the message is negative. If not, the message is positive.

When a call is completed, the experimentation framework 300 changes the state from Registered to Pending and, accordingly, the condition changes from Experimental to Off. In this way, the feature itself remains off as long as the result of the call is pending.

If the call obtains a positive message, then the query result in response to the call includes a success message. If negative, the query result includes a failure message. In some embodiments, the query result is reported to the feature developer 100, who must then log the query result in the experimentation framework 300.

If the query result includes a failure message, the experimentation framework 300 changes the state from Pending to Failed and, accordingly, the condition (which was Off while the state was Pending) remains Off. The ticket generator 206 is configured to generate and send a repair ticket to the developer or team responsible for a feature that will not operate on a particular device. The ticket may include a message, a priority for the action, and any of a variety of data about the particular device.

If the query result includes a success message, the experimentation framework 300 changes the state from Pending to Succeeded and, accordingly, the condition changes from Off to On. Because the call indicated success on the particular mobile device, the feature associated with that call is turned on and the feature is allowed to install and run.

The circumstance engine 200 in some implementations acts as a gatekeeper between a feature developer or team and the experimentation framework 300. The circumstance engine 200 may operate like one or more if and else-if statements which are intended to query the experimentation framework 300 and send a reply to the developer or team either denying or allowing a new feature to be released to a particular device. For example, for a particular feature, based on information in the experimentation framework 300:

IF (state is Succeeded)
　{condition is On
ELSE IF (state is Registered)
　{condition is Experimental
ELSE
　{condition is Off Before a new feature is allowed to run on a mobile device, the circumstance engine 200 must return an On condition, which is only returned if the feature has been tested using a call that indicates the feature will succeed.

Although the one or more flowcharts may depict the operations as a sequential process, many of the operations can be performed in parallel or concurrently. In addition, the order of the operations may be rearranged. A process is terminated when its operations are completed. The term process may correspond to method, procedure, and the like. The steps of a process or method may be performed in whole or in part, may be performed in conjunction with some or all of the steps in the same or other methods, and may be performed by or in conjunction with any of a variety of different systems, such as the systems described herein.

Figure 3:
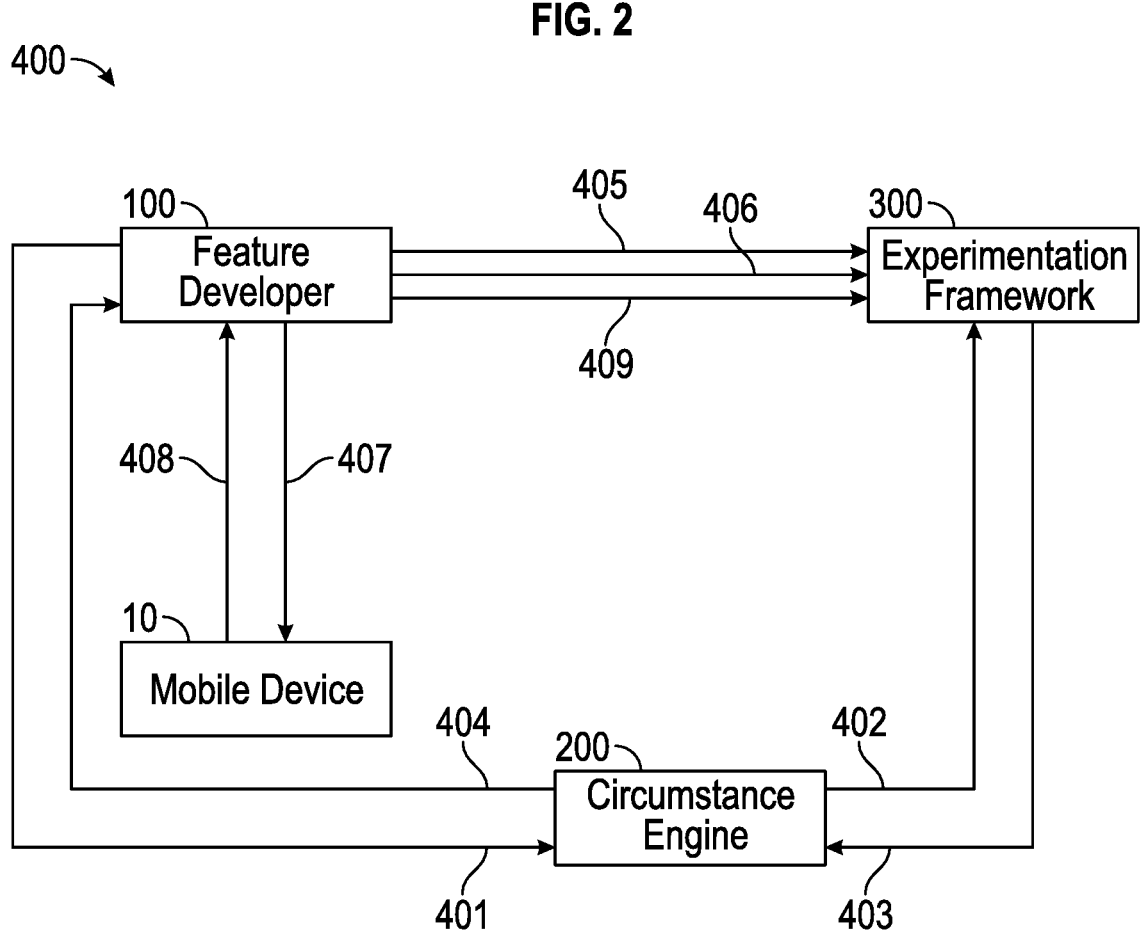
FIG. 3 is a flow diagram illustrating an example method of testing the capability of a mobile device to run a particular feature, in accordance with some example implementations.

FIG. 3 is a flow diagram illustrating an example method 400 of testing the capability of a mobile device to run a particular feature. The method 400 in some implementations includes a feature developer 100, a mobile device 10, a circumstance engine 200, and an experimentation framework 300. Although the circumstance engine 200 and the experimentation framework 300 are illustrated in blocks that are separate from the mobile device 10, both the engine 200 and framework 300 may reside on the mobile device 10 itself. In such implementations, the example testing method 400 is performed locally, as a closed-loop procedure, independent of a remote server. In other implementations, the method 400 may coordinate its operation and results with a server-based rollback system or method.

The feature developer 100 at operation 401 may send a query about a particular feature to the circumstance engine 200 which, in response, sends a lookup request to the experimentation framework 300 at operation 402. In response, the experimentation framework 300 prepares a reply 403 to the circumstance engine 200 that includes the state (and/or the corresponding condition) associated with that particular feature. The circumstance engine 200 may then evaluate the information in the reply according the one or more if and else-if statements, as described above. The circumstance engine 200 sends (at operation 404) the reply to the feature developer 100.

If the particular feature is not found in the experimentation framework 300, then the reply includes no information and, in response, the circumstance engine 200 may send a directive to the developer 100 to register the particular feature in the experimentation framework 300 before proceeding to allow the feature to run.

If the particular feature is found in the experimentation framework 300 and the state is Registered, then the reply may include the state (Registered) and/or the corresponding condition (Experimental). The mobile device 10 will not run the feature as long as the condition is Experimental. The circumstance engine 200 in turn may send the reply to the developer 100. Upon learning the condition of the particular feature is Experimental, the developer 100 may proceed to build a call that will test whether the application will run successfully if the particular feature is installed and run on a select mobile device.

If the particular feature is found in the experimentation framework 300 and the state is Pending, then the reply may include the state (Pending) and/or the corresponding condition (Off). The mobile device 10 will not run the feature as long as the condition is Pending. The circumstance engine 200 in turn may send the reply to the developer 100. Upon learning the condition of the particular feature is Pending, the developer 100 will understand that a call is in progress, the results are pending (or not yet submitted to the experimentation framework 300), and the feature will remain off as long for that select mobile device as the state is Pending.

If the particular feature is found in the experimentation framework 300 and the state is Failed, then the reply may include the state (Failed) and/or the corresponding condition (Off). The mobile device 10 will not run the feature as long as the condition is Off. The circumstance engine 200 in turn may send the reply to the developer 100. Upon learning the condition of the particular feature is Failed, the developer 100 will understand that the call failed, and the feature will remain off for that select mobile device.

If the particular feature is found in the experimentation framework 300 and the state is Succeeded, then the reply may include the state (Succeeded) and/or the corresponding condition (On). The mobile device 10 will always run the feature if the condition is On. The circumstance engine 200 in turn may send the reply to the developer 100. Upon learning the condition of the particular feature is Succeeded, the developer 100 will understand that the call succeeded, the feature condition is On, and the feature may be safely run on that select mobile device.

The feature developer 100 may add a new feature to the experimentation framework 300 at any time, at operation 405. For each new feature added, the experimentation framework 300 sets the state to Registered and, accordingly, sets the condition to Experimental.

When the feature developer 100 has designed and built a call for a new feature, the feature developer 100 may log the request to send the call with the experimentation framework 300 at operation 406. When a call is requested, the experimentation framework 300 changes the state to Pending and, accordingly, sets the condition to Off.

The feature developer 100 may then, at operation 407, send the call associated with the new feature to a select mobile device 10. The call includes one or more instructions configured to obtain a message from the select mobile device 10. The message is positive or negative and is associated with the capability of the select mobile device 10 to run an application successfully if the new feature is installed and running. The mobile device 10 executes the call, obtains the resulting message, and sends a query result back to the feature developer 100 at operation 408.

If the resulting message is positive, the query result includes a success message to the feature developer 100. If the resulting message is negative, the query result includes a failure message to the feature developer 100.

In some implementations, the feature developer 100 is responsible for logging the result of the call, at operation 409, in the experimentation framework 300. Unless and until a result is logged in the experimentation framework 300, the state remains Pending and the feature condition remains Off for that select mobile device.

If the feature developer 100, at operation 409, logs a query result that includes a failure message, then the experimentation framework 300 changes the state to Failed and, accordingly, the condition (which as set of Off while the call was pending) remains set to Off for that select mobile device. In response to this condition, the ticket generator 206 may generate and send a repair ticket to the developer 100 responsible for the new feature. The ticket may include a message, a priority associated with the repair, and a variety of information about the new feature, the call, the query result, and the select mobile device.

If the feature developer 100, at operation 409, logs a query result that includes a success message, then the experimentation framework 300 changes the state to Succeeded and, accordingly, changes the condition to On for that select mobile device.

The various operations associated with the method 400 may be executed for a number of features, feature developers 100, and mobile devices 10 according to the experimentation framework 300 stored locally on each mobile device 10. In this aspect, the experimentation framework 300 operates as a local gatekeeper for a plurality of features.

All the current properties for each experimentation framework 300 on various mobile device 10 may be stored in a relational database that includes one or more tables, each containing the current state and current condition of each feature. The tables may include a server table located on a server and a remote table located on a select mobile device, thereby enabling the select mobile device to control each feature locally (according to the remote table) without the need to access the server table.

Figure 4:
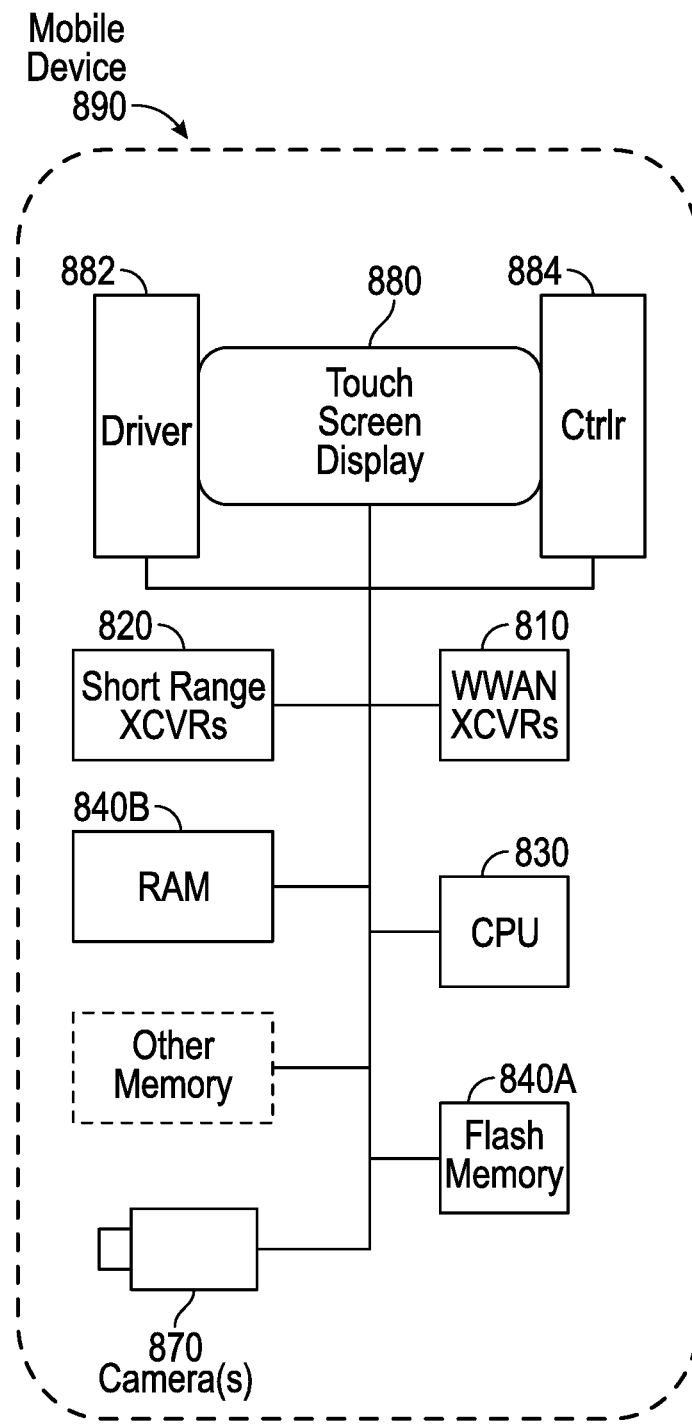
FIG. 4 is a diagrammatic representation of an example hardware configuration for a client device embodied as a mobile device.

FIG. 4 is a high-level functional block diagram of an example client device 110 embodied as an example mobile device 890. Mobile device 890 includes a flash memory 840A which includes programming to perform all or a subset of the functions described herein. Mobile device 890 can include a camera 870 that comprises at least two visible-light cameras (first and second visible-light cameras with overlapping fields of view) or at least one visible-light camera and a depth sensor with substantially overlapping fields of view. Memory 840A may further include multiple images or video, which are generated via the camera 870.

As shown, the mobile device 890 includes an image display 880, an image display driver 882 to control the image display 880, and a controller 884. In the example of FIG. 4, the image display 880 is a touch-screen display which also operates as a user input device.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 4 therefore provides block diagram illustrations of the example mobile device 890 having a touch screen display for displaying content and receiving user input as (or as part of) the user interface.

As shown in FIG. 4, the mobile device 890 includes at least one digital transceiver (XCVR) 810, shown as WWAN XCVRs, for digital wireless communications via a wide area wireless mobile communication network. The mobile device 890 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 890, the mobile device 890 can include a global positioning system (GPS) receiver. Alternatively, or additionally the mobile device 890 can utilize either or both the short range XCVRs 820 and WWAN XCVRs 810 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 810, 820.

The transceivers 810, 820 (network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web-related inputs, and various types of mobile message communications to/from the mobile device 890.

The mobile device 890 further includes a microprocessor, shown as CPU 830, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 830, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 830 or processor hardware in smartphone, laptop computer, and tablet.

The microprocessor 830 serves as a programmable host controller for the mobile device 890 by configuring the mobile device 890 to perform various operations, for example, in accordance with instructions or programming executable by processor 830. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 890 includes a memory or storage device system, for storing data and programming. In the example, the memory system may include a flash memory 840A and a random-access memory (RAM) 840B. The RAM 840B serves as short term storage for instructions and data being handled by the processor 830, e.g., as a working data processing memory. The flash memory 840A typically provides longer term storage.

Hence, in the example of mobile device 890, the flash memory 840A is used to store programming or instructions for execution by the processor 830. Depending on the type of device, the mobile device 890 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Figure 5:
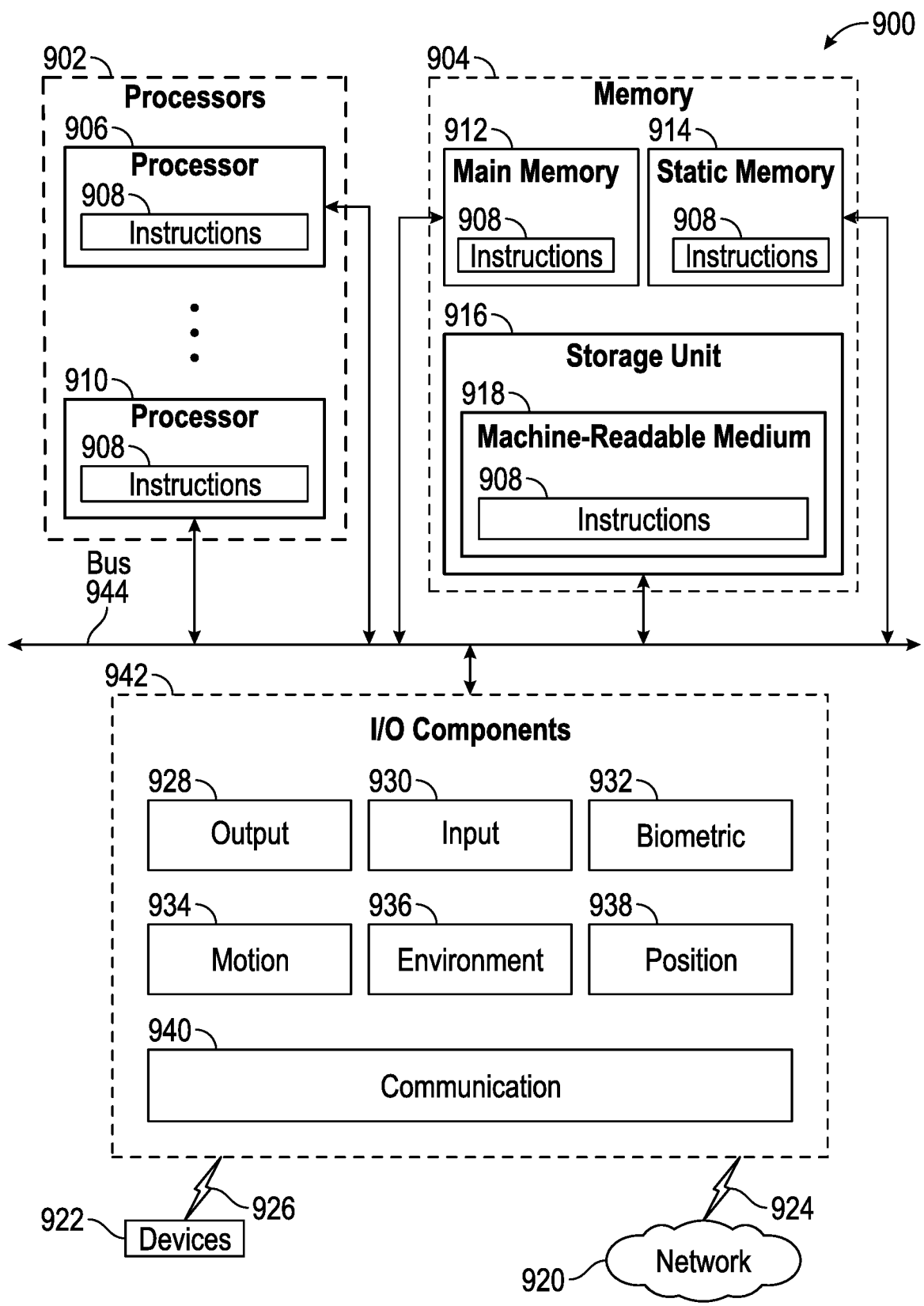
FIG. 5 is a diagrammatic representation of a machine in the form of a computer system within which a set of instructions may be executed for causing the machine to perform any one or more of the methodologies discussed herein, in accordance with some examples.

FIG. 5 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and input/output (I/O) components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 5 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 5. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, a resistance feedback mechanism), other signal generators, and so forth. The input components 930 may include alphanumeric input components (e.g., a keyboard, a touch screen configured to receive alphanumeric input, a photo-optical keyboard, or other alphanumeric input components), pointing-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near-field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 6:
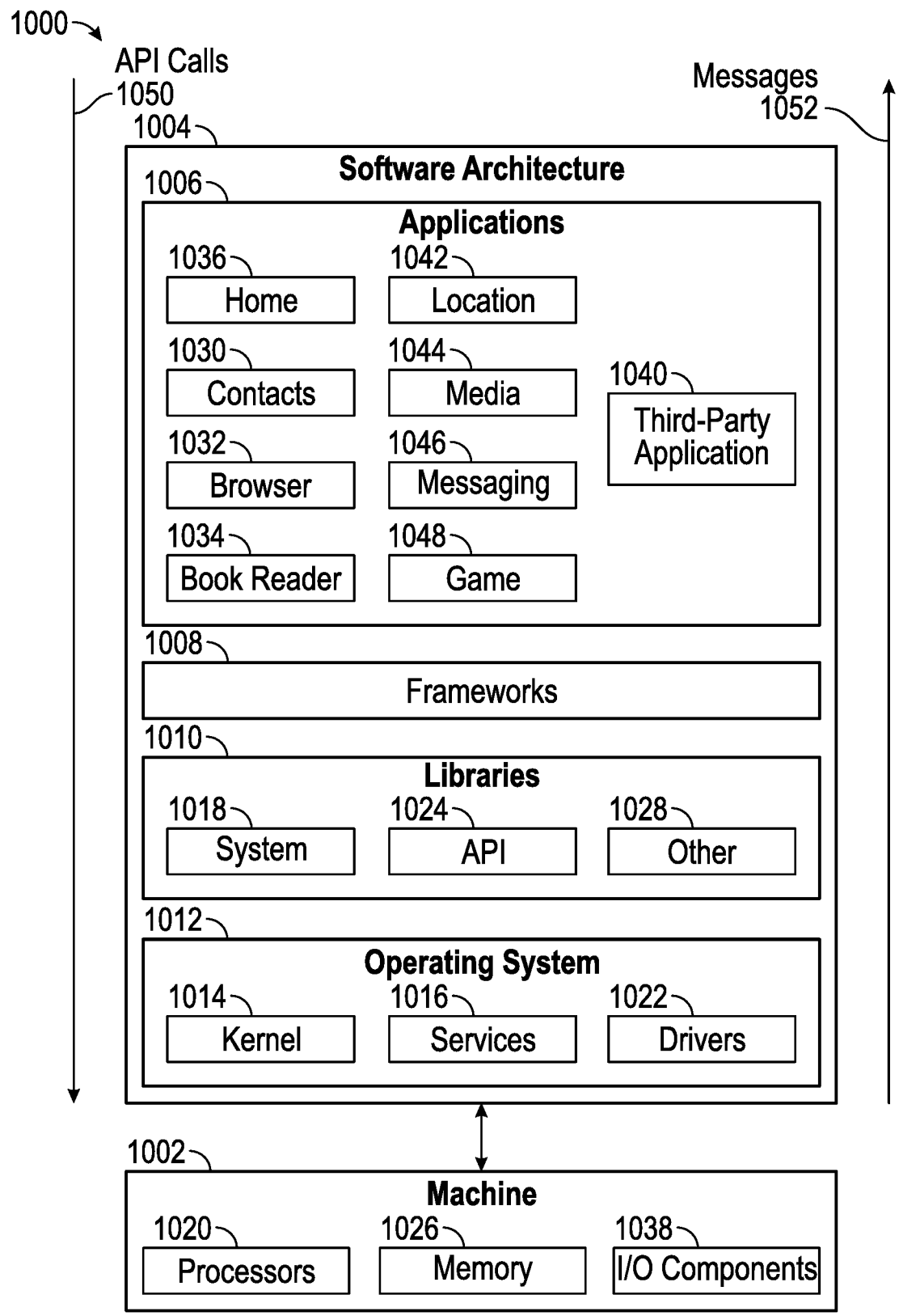
FIG. 6 is block diagram showing a software architecture within which the present disclosure may be implemented, in accordance with examples.

FIG. 6 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, Bluetooth® or Bluetooth® Low Energy (BLE) drivers, flash memory drivers, serial communication drivers (e.g., Universal Serial Bus (USB) drivers), Wi-Fi® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., a WebKit® engine to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The third-party applications 1006 are programs that execute functions defined within the programs. Various programming languages can be employed to create one or more of the applications 1006, structured in a variety of manners, such as object-oriented programming languages (e.g., Objective-C, Java, or C++) or procedural programming languages (e.g., C or assembly language).

In a specific example, the third-party application 1040 (e.g., an application developed using the Google Android or Apple iOS software development kit (SDK) by an entity other than the vendor of the particular platform) may be mobile software running on a mobile operating system such as Google Android, Apple iOS (for iPhone or iPad devices), Windows Mobile, Amazon Fire OS, RIM BlackBerry OS, or another mobile operating system. In this example, the third-party application 1040 can invoke the API calls 1050 provided by the operating system 1012 to facilitate functionality described herein.

What is claimed is:

1. A method of testing the capability of an application to run a feature, comprising:

maintaining, by a processor on a first mobile device, an experimentation framework for a plurality of features, wherein each feature comprises a package of code, a call, a state, and a condition;

registering, by said processor, in said experimentation framework a first feature associated with an application on said first mobile device, said first feature comprising a first package of code, a first call, a first state, and a first condition, wherein said first feature was not previously installed on said first mobile device;

setting said first state to a registered state and said first condition to an experimental condition;

constructing said first call to include one or more requests designed to obtain a query result, wherein said query result indicates a success or a failure of said application to run said first feature on said first mobile device;

testing said first feature, by said processor, by sending said first call to said application on said first mobile device and receiving said query result in response;

setting said first state to a pending state and said first condition to an off condition until said query result is returned; and updating, by said processor, said first state associated with said application, said first feature, and said first mobile device according to said query result by:

in response to said query result indicating success, setting said first state to a succeeded state, setting said first condition to an on condition, and delivering said first package of code to said first mobile device for installation.

2. The method of claim 1, wherein said state comprises a description selected from the group consisting of said registered state, said pending state, a failed state, and said succeeded state, and wherein said condition comprises a status selected from the group consisting of said experimental condition, said off condition, and said on condition.

3. The method of claim 2, wherein said step of maintaining said experimentation framework further comprises:

setting said condition to said experimental condition as long as said state remains set to said registered state;

setting said condition to said off condition as long as said state remains set to said pending state or said failed state; and setting said condition to said on condition as long as said state remains set to said succeeded state.

4. The method of claim 1, wherein said step of updating further comprises:

in response to said query result indicating failure, setting said first state to a failed state and said first condition to said off condition; and generating a repair ticket associated with said first feature, said application, and said first mobile device.

5. The method of claim 1, wherein said step of testing said first feature is substantially performed by said first mobile device; and wherein said step of updating said first state is substantially performed by said first mobile device.

6. The method of claim 1, wherein said step of constructing said first call is substantially performed by said first mobile device.

7. A system for testing the capability of an application to run a feature, comprising:

a memory that stores instructions; and a processor configured by said instructions to perform operations comprising:

maintaining an experimentation framework on a first mobile device for a plurality of features, wherein each feature comprises a package of code, a call, a state, and a condition;

registering in said experimentation framework a first feature associated with an application on said first mobile device, said first feature comprising a first package of code, a first call, a first state, and a first condition, wherein said first feature was not previously installed on said first mobile device;

setting said first state to a registered state and said first condition to an experimental condition;

constructing said first call to include one or more requests designed to obtain a query result, wherein said query result indicates a success or a failure of said application to run said first feature on said first mobile device;

testing said first feature, by said processor, by sending said first call to said application on said first mobile device and receiving said query result in response;

setting said first state to a pending state and said first condition to an off condition until said query result is returned; and updating said first state associated with said application, said first feature, and said first mobile device according to said query result by:

in response to said query result indicating success, setting said first state to a succeeded state, setting said first condition to an on condition, and delivering said first package of code to said first mobile device for installation.

8. The system of claim 7, wherein said state comprises a description selected from the group consisting of said registered state, said pending state, a failed state, and said succeeded state, and wherein said condition comprises a status selected from the group consisting of said experimental condition, said off condition, and said on condition.

9. The system of claim 8, wherein said operation of maintaining said experimentation framework further comprises:

setting said condition to said experimental condition as long as said state remains set to said registered state;

setting said condition to said off condition as long as said state remains set to said pending state or said failed state; and setting said condition to said on condition as long as said state remains set to said succeeded state.

10. The system of claim 7, wherein said operation of updating further comprises:

in response to said query result indicating failure, setting said first state to a failed state and said first condition to said off condition; and generating a repair ticket associated with said first feature, said application, and said first mobile device.

11. The system of claim 7, wherein said operation of testing said first feature is substantially performed by said first mobile device; and wherein said operation of updating said first state is substantially performed by said first mobile device.

12. The system of claim 7, wherein said operation of constructing said first call is substantially performed by said first mobile device.

13. A non-transitory processor-readable storage medium that stores processor executable instructions that, when executed by a processor of a machine, cause said machine to perform operations comprising:

maintaining an experimentation framework on a first mobile device for a plurality of features, wherein each feature comprises a package of code, a call, a state, and a condition;

registering in said experimentation framework a first feature associated with an application on said first mobile device, said first feature comprising a first package of code, a first call, a first state, and a first condition, wherein said first feature was not previously installed on said first mobile device;

setting said first state to a registered state and said first condition to an experimental condition;

constructing said first call to include one or more requests designed to obtain a query result, wherein said query result indicates a success or a failure of said application to run said first feature on said first mobile device;

testing said first feature, by said processor, by sending said first call to said application on said first mobile device and receiving said query result in response;

setting said first state to a pending state and said first condition to an off condition until said query result is returned; and updating said first state associated with said application, said first feature, and said first mobile device according to said query result by:

in response to said query result indicating success, setting said first state to a succeeded state, setting said first condition to an on condition, and delivering said first package of code to said first mobile device for installation.

14. The non-transitory processor-readable storage medium of claim 13, wherein said state comprises a description selected from the group consisting of said registered state, said pending state, a failed state, and said succeeded state, and wherein said condition comprises a status selected from the group consisting of said experimental condition, said off condition, and said on condition;

wherein said operation of testing said first feature further is substantially performed by said first mobile device; and wherein said operation of updating is substantially performed by said first mobile device.

* * * * *